June 27, 1961  H. W. CLARKE ET AL  2,990,286
METHOD OF STORING PREPARED FOODS
Original Filed June 11, 1954  2 Sheets-Sheet 1
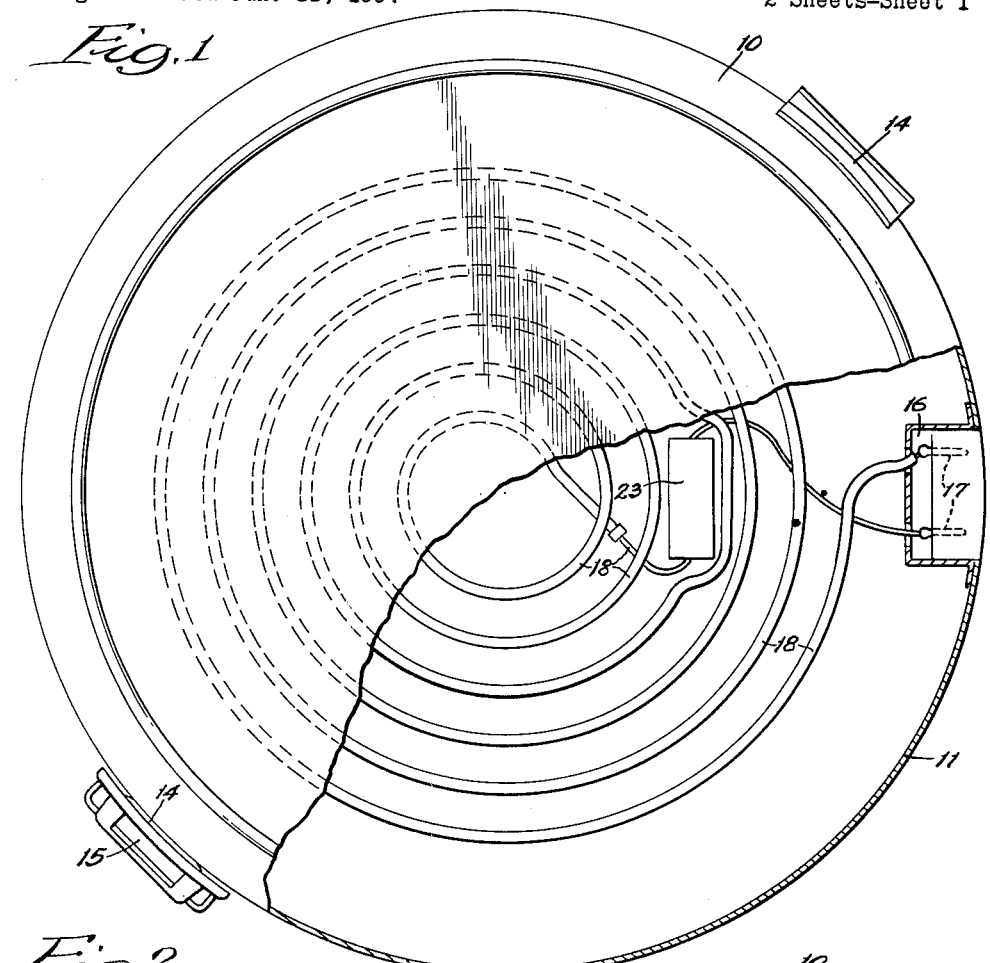
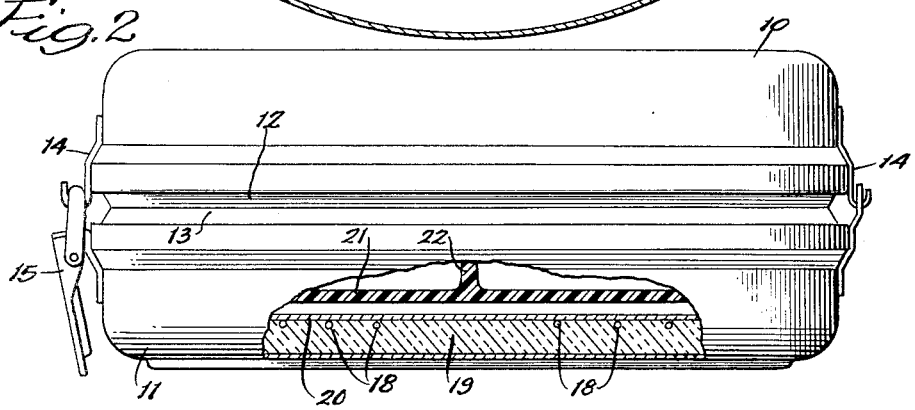
INVENTORS:
Houghton W. Clarke and
BY Norman E. Wymbs,
Dawson, Tilton & Graham,
ATTORNEYS.

June 27, 1961 H. W. CLARKE ET AL 2,990,286
METHOD OF STORING PREPARED FOODS
Original Filed June 11, 1954 2 Sheets-Sheet 2
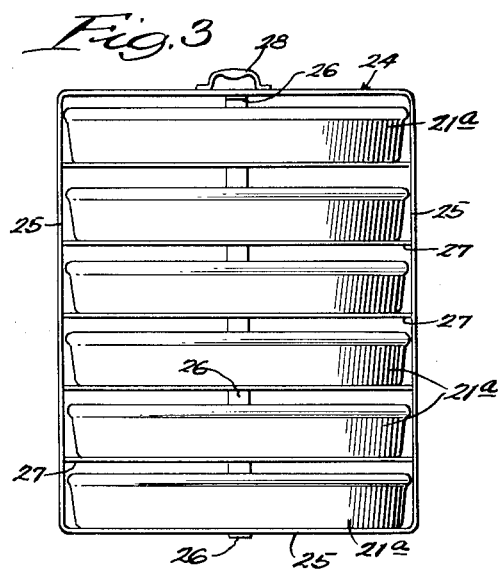
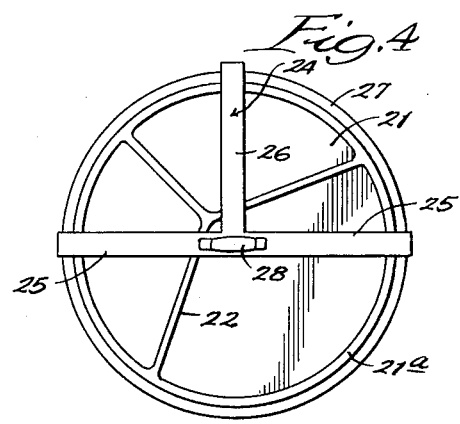
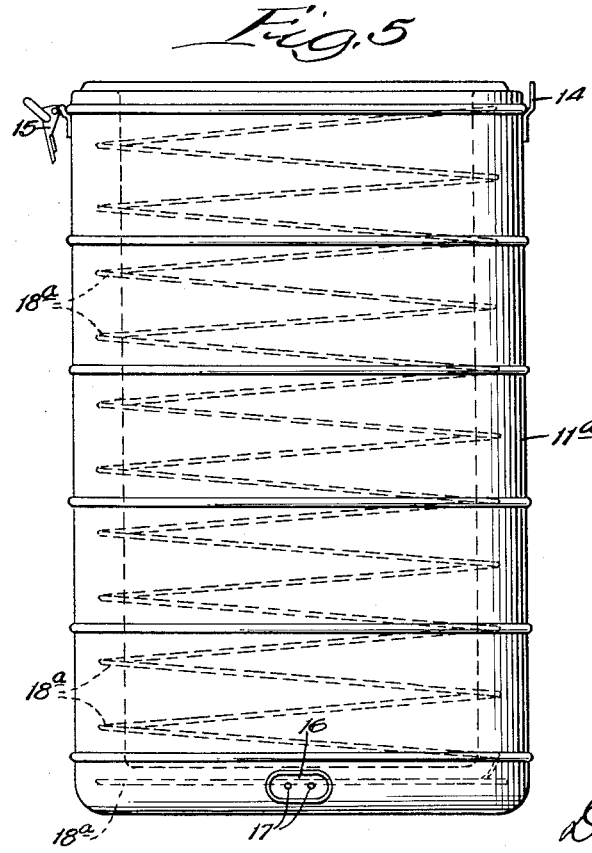
INVENTORS:
Houghton W. Clark and
BY Norman E. Wymbs.
Dawson, Tilton & Graham
ATTORNEYS.

United States Patent Office 2,990,286
Patented June 27, 1961

2,990,286
METHOD OF STORING PREPARED FOODS
Houghton W. Clarke, 2226 Sherman Ave., and Norman E. Wymbs, 3200 Park Place, both of Evanston, Ill.
Continuation of application Ser. No. 435,982, June 11, 1954. This application May 7, 1958, Ser. No. 734,382
9 Claims. (Cl. 99—171)

This invention relates to a food container and storing method. The invention is particularly useful as a means and system for heating, storing, and preserving hot foods over substantial periods of time.

The present application is a continuation of our copending application Serial No. 435,982, filed June 11, 1954, and now abandoned.

In Clarke U.S. Patent No. 2,656,946, there is described a means for storing hot or chilled foods over periods of time, and in the process set out, an oven dish is heated and in heated condition receives the hot food which is to be preserved and is sealed within a closed container. We have now discovered that greatly improved results can be obtained by employing heating elements within the container itself, whereby the thick dish, which serves as a heat storage battery, is charged slowly with heat while within the container, so that thereafter the container may be sealed with the hot food in the heat-packed dish for maintaining the food in a heated condition for long periods of time. Further, it is possible to supply heat to the container after the food has been introduced into the dish so as to drive the expanded air out of the container slowly and thus to create insulation about the dish, the heat being thus concentrated within the thick body of the dish. Thus, with the new development, after putting food within the container, it is possible to pass current through heat resistance elements to drive out air from the container, with the result that the reduced air content has less capacity to hold moisture and the food does not dry out to any substantial extent.

An object of the present invention is to provide a structure overcoming the disadvantages set out above and bringing about the advantages mentioned. A further object is to provide a container structure in which a heavy dish formed of heat-absorbing material may be charged slowly with heat from a resistance element while also providing heat for the driving of air from the container after the dish has been filled, or partially filled, and the container has been sealed. Yet another object is to provide in a container structure means for maintaining a selected temperature within the container and for repeatedly furnishing heat to the container when the temperature therein falls below a selected point. Other specific objects and advantages will appear as the specification proceeds.

The invention is shown, in illustrative embodiments, by the accompanying drawings, in which—

FIGURE 1 is a broken top plan view of a container embodying our invention; FIGURE 2 is a side view in elevation, a portion of the container being broken away to show the internal structure; FIGURE 3 a side view in elevation of a rack carrying a plurality of heavy, heat-absorbing dishes; FIGURE 4, a top plan view of the rack structure shown in FIGURE 3; and FIGURE 5, a side view in elevation of the bottom portion of a container for receiving the rack and dish structure shown in FIGURE 3.

In the illustration given in FIGURES 1 and 2, 10 designates a container structure similar to that shown in said Clarke Patent 2,656,946, except that the bottom portion of the container is provided with internal mechanism for heating the dish. In the structure shown, there is an upper container 10 and a lower container 11, each of the containers being provided with annular rubber sealing gaskets 12 and 13, respectively, so that when the two complementary containers 10 and 11 are clamped together, the sealing gaskets 12 and 13, which are preferably formed of rubber or resilient material, are effective in forming an airtight seal between the containers. The upper container 10 is provided with hooks 14, and the lower container 11 is provided with a clamping device 15 for drawing the containers tightly together to effect a seal between the resilient gaskets 12 and 13. Since the structure described is well known and is shown in detail in Clarke Patent 2,656,946, a detailed description herein is believed unnecessary.

Within the lower container 11, we provide a recess or socket 16 within a side wall, and secure therein prongs 17 adapted to be connected to an electrical socket furnishing current to the electrical resistance element within the container. The prongs 17 may be received within sockets carried upon a support adapted to receive multiple containers, or the socket connection may be equipped with a cord adapted to be connected to an electrical outlet, etc.

The electric resistance elements leading from the prongs 17 are illustrated in FIGURES 1 and 2 as forming coils within the bottom of the container 11. In the illustration given, the coils are indicated by the numeral 18 and they are supported within mineral insulation 19 or other suitable insulating material. A pan 20, formed of metal or other suitable material, closes the insulation-containing compartment and extends into close proximity to the heat storage dish 21.

The dish 21 may be formed of ovenware or heat-absorbing plastic or other material, and the dish may be provided with a partition wall 22 or formed in any suitable shape or in any desired contour. The partition wall or walls 22 may divide the dish 21 into two, three, or any desired number of compartments adapted to receive foods.

Within the electrical circuit we provide a thermostat 23, as shown best in FIGURE 1, in order to maintain the temperature within the dish at a selected point or range.

In the practice of our invention, the dish 21 may be preliminarily heated by plugging the prongs 17 within an electrical socket connection and the prepared food may be then introduced into the compartments of the dish 21. The prepared or pre-cooked food may be placed at serving temperature into the dish or, if desired, the food may be introduced into the dish 21 prior to any substantial heating thereof or in frozen condition, and all of the heating effected at a later stage. After the introduction of the food into the container 21, we prefer to place the upper container 10 in the position shown in FIGURE 2 and to clamp it into sealing position with the resilient gaskets 12 and 13 in contact. As the heat increases within the dish, the air expands slowly and after a time the internal pressure is sufficient (i.e., greater than the external pressure outside of the container) to allow at least some of the air to escape between the gaskets 12 and 13. Heat is charged into the heat storage battery or dish 21, which thus becomes effective in receiving and storing the heat without excessively heating the foods within the dish, that is, without heating the foods to cooking temperatures. At the same time, the driving out of a substantial portion of the air within the container reduces the air content and the reduced air content has less capacity to hold moisture and as a result food does not dry out to any substantial extent even though there is a long period of storage. When the temperature within the container reaches a predetermined point, the thermostat 23 cuts off the current and as the vessel cools slightly, it is found that the resilient gaskets 12 and 13 provide an effective seal for maintaining a partial vacuum within the container and prevent the ingress of air.

The heated meals may be kept at serving temperatures for long periods of time within the vacuum sealed container, the desired temperature range being maintained automatically by the theormostatically controlled heating element. It has been found that by means of the present invention prepared meal may be kept in moist flavorful condition and at serving temperatures for twelve hours or more. As indicated above, the serving temperatures at which the meals are maintained within the sealed containers are lower than the cooking temperatures of the meals and, in addition, are higher than the temperatures at which food bacterial will form or grow. In other words, the thermostats may be set to maintain the meals at selected temperatures ranging not below about 125° F. nor above 160° F. in order to avoid continued cooking at higher temperature levels or the development of an objectionable bacterial count because of storage at lower temperatures.

With the structure shown, we find that the introduction of heat into the heat-absorbing container 21 is slow and that subsequently the release of heat from the dish to the food and surrounding air is also slow. The resistance element against the inner pan 20 and the dish 21 is effective in the slow and even transfer of heat to the ovenware glass, which is leaded to receive and retain latent heat and which forms a heat storage battery.

While a single unit is shown equipped with prongs for connection to a single electrical connection, we prefer to employ a charging rack having a large number of sockets mounted thereon whereby a long series of containers can be quickly plugged into the electrical connections of the rack for simultaneously heating a large number of containers.

In the modification shown in FIGURES 3, 4 and 5, we provide an outer insulated container 11a corresponding to the container portion 11 shown in FIGURE 2, but the container 11a is elongated so as to provide a chamber for receiving a large number of dishes 21a. The container 11a has a bottom portion substantially the same as that shown in FIGURE 2, but, in addition, the resistance coil 18a extends upwardly along the side walls of the elongated container 11a so as to provide means for heating the container 11a throughout its length. The top of container 11a is closed by clamping thereon a container corresponding exactly to container 10 of FIGURE 2.

A plurality of dishes 21a are preferably supported within a wire rack 24 which, as shown best in FIGURE 3, has laterally-extending straps 25 and a rearwardly-extending strap 26, the straps meeting at the bottom of the container and there being welded together. Spaced supports 27 are provided within the rack for supporting the dishes 21a in spaced relation. It will be noted that the rack 24 has one open side, through which the dishes 21a may be introduced or withdrawn from the rack, as desired. The rack may be provided at its top with a handle 28 to facilitate removal from or insertion of the rack into the container 11a.

In the operation of the container shown in FIGURES 3 to 5, inclusive, as well as the container shown in FIGURES 1 and 2, we find that effective results are obtained by continuing the application of heat after the dishes containing food are within the container, so that air is forced out of the container to a substantial extent. The ability to increase the heat input so as to effect this result enables us to retain within the container a minimum amount of heat, since the resilient seals 12 and 13 permit the escape of air, but, upon the dropping of temperature, prevent the ingress of air. By the use of the thermostat 23, the removal of air can thus be effectively controlled and in an automatic manner, the yielding character of the seals 12 and 13 being correlated to the pressure produced at predetermined temperatures to obtain this desired result.

While in the foregoing specification we have set forth a specific structure in considerable detail for the purpose of illustrating our invention, it will be understood that such details of structure may be varied widely by those skilled in the art without departing from the spirit of our invention.

We claim:

1. In a method of storing complete individual servings of prepared meals, the steps of placing hot cooked foods into a heavy dish formed of heat-absorbing material, enclosing the dish and food within a pair of heat-insulated hollow bodies secured together in sealing relation with resilient means between the bodies to permit the escape of air under pressure, electrically heating the sealed chamber by a thermostatically-controlled heating element disposed therein and thereby increasing the internal pressure within said chamber to bring about the discharge of air therefrom, reducing the internal pressure within said container by reducing the temperature therein while at the same time preventing the flow of air into said chamber, and thereafter heating the chamber by the thermostatically-controlled heating element disposed therein to maintain the meal at a selected serving temperature below the cooking temperature thereof while maintaining the internal pressure below the pressure externally of said chamber.

2. The method of claim 1 in which a plurality of dishes are supported within the hollow bodies and are charged with heat therein.

3. In a method for storing individual servings of hot meals, the steps of heating a heavy dish of heat-absorbing material to charge the same with heat to a temperature approximating the temperature of the food to be introduced into the dish, introducing cooked foods into the dish, enclosing the heated dish and foods within a pair of heat-insulated hollow bodies secured together in sealing relation with resilient means between the bodies to permit the escape of air under pressure, heating the interior chamber by a thermostatically-controlled heating element disposed therein to a temperature below the cooking temperature of the foods to increase the internal pressure within said container and to bring about the escape of air from the chamber without reducing the temperature of the dish and food, allowing the temperature and pressure within the container to fall below a point at which condensation occurs within the container, and thereafter heating the chamber by the thermostatically-controlled heating element disposed therein to maintain the food at serving temperature within the sealed container while maintaining the internal pressure below the pressure externally of said container.

4. The method of claim 3 in which said serving temperature is below the temperature at which said food will cook and above a temperature conducive to the formation of objectionable bacteria count in the food.

5. The method of claim 3 in which a plurality of dishes are supported within the hollow bodies and are charged with heat therein.

6. The method of claim 3 in which electric resistance elements within the hollow bodies are subjected to current flow to produce the heat within said chamber.

7. A method of storing hot prepared meals at serving temperatures comprising enclosing a heat-absorbing food-containing dish within an insulated container from which air can escape but cannot enter, heating said container by a thermostatically-controlled heating element disposed therein and thereby charging said food-containing dish with heat to increase the internal pressure and to bring about the escape of air from said container, lowering the temperature within said container to reduce the pressure below external pressure for maintaining the food in moist condition, and thereafter internally heating the container by the thermostatically-controlled heating element disposed therein to maintain said food at serving temperature while maintaining the internal pressure within said container below the external air pressure.

8. The method of claim 7 in which said serving temperature is below the cooking temperature of the food and above the temperature conducive to the formation of objectionable bacteria count in the food.

9. The method of claim 7 in which the serving temperature falls within the range of 125 to 160° F.

References Cited in the file of this patent

UNITED STATES PATENTS

| | | |
|---|---|---|
| 2,585,310 | Gronlund | Feb. 10, 1952 |
| 2,662,965 | Becker | Dec. 15, 1953 |
| 2,715,898 | Michaelis et al. | Aug. 23, 1955 |
| 2,767,100 | Clarke | Oct. 16, 1956 |